(12) United States Patent
Ogose

(10) Patent No.: US 11,091,028 B2
(45) Date of Patent: Aug. 17, 2021

(54) FUEL SUPPLY PORT DEVICE

(71) Applicant: NIFCO INC., Yokosuka (JP)

(72) Inventor: Kensuke Ogose, Yokosuka (JP)

(73) Assignee: NIFCO INC., Yokosuka (JP)

( * ) Notice: Subject to any disclaimer, the term of this patent is extended or adjusted under 35 U.S.C. 154(b) by 133 days.

(21) Appl. No.: 16/619,807

(22) PCT Filed: Jun. 20, 2018

(86) PCT No.: PCT/JP2018/023478
§ 371 (c)(1),
(2) Date: Dec. 5, 2019

(87) PCT Pub. No.: WO2019/004026
PCT Pub. Date: Jan. 3, 2019

(65) Prior Publication Data
US 2020/0130503 A1    Apr. 30, 2020

(30) Foreign Application Priority Data
Jun. 27, 2017   (JP) .............................. JP2017-125227

(51) Int. Cl.
*B60K 15/04*   (2006.01)
*B60K 15/01*   (2006.01)
*B67D 7/32*    (2010.01)
*B60K 15/03*   (2006.01)

(52) U.S. Cl.
CPC .............. *B60K 15/04* (2013.01); *B60K 15/01* (2013.01); *B67D 7/3236* (2013.01); *B60K 2015/03401* (2013.01); *B60K 2015/0461* (2013.01)

(58) Field of Classification Search
CPC .................. B60K 15/04; B60K 15/01; B60K 2015/0461; B60K 2015/03401; B67D 7/3236

USPC ......................................................... 141/350
See application file for complete search history.

(56) References Cited

U.S. PATENT DOCUMENTS

2014/0139967 A1   5/2014  Koith
2017/0072790 A1   3/2017  Frank et al.

FOREIGN PATENT DOCUMENTS

| JP | H02-65873  | U  | 5/1990  |
| JP | H02-73067  | U  | 6/1990  |
| JP | H03-50526  | U  | 5/1991  |
| JP | H07-16150  | Y2 | 4/1995  |
| JP | 2009-220590| A  | 10/2009 |

OTHER PUBLICATIONS

PCT/ISA/210, "International Search Report for International Application No. PCT/JP2018/023478," dated Sep. 18, 2018.

*Primary Examiner* — Timothy P. Kelly
*Assistant Examiner* — Christopher M Afful
(74) *Attorney, Agent, or Firm* — Manabu Kanesaka

(57) ABSTRACT

A fuel supply port device includes a tubular main member portion where a fuel supply nozzle is inserted from a tube-upper-end side; a cover member covering a side portion on the tube-upper-end side of the tubular main member portion from an outside; an earth member electrically connecting a fuel-supply-nozzle side to be inserted and a body-panel side; and a seal member sealing a pass-through portion of the earth member formed in the cover member. The seal member includes an insert-through portion allowing a one-end-portion side of the earth member to be inserted to pass through from the outside of the tubular main member portion.

5 Claims, 11 Drawing Sheets

FUEL SUPPLY PORT DEVICE

FIELD OF TECHNOLOGY

The present invention relates to an improvement of a fuel supply port device.

BACKGROUND ART

As for a filler pipe comprising an earth circuit formed by connecting a metal retainer attached to an upper end of a resin filler pipe (also called an inlet pipe and the like) and an earth wire through a conductive resin ring wherein the metal retainer is molded as an insert portion outside the metal retainer, there is a device shown in Patent Document 1.

According to the Patent Document 1, although there is no need to braze the earth wire to the metal retainer, there is a need to provide a conductive resin piece which contacts the conductive resin ring outside the metal retainer so as to bond one end of the earth wire to the conductive resin piece.

PRIOR ART DOCUMENT

Patent Document

Patent Document 1: Japanese Examined Utility Model Application Publication No. H07-16150

SUMMARY OF THE INVENTION

Problems to be Solved by the Invention

A main object of the present invention is that in this type of fuel supply port device, which comprises a tubular main member portion and a cover member attached to a tube-upper-end side thereof, wherein the cover member comprises a pass-through portion of an earth member, in a state wherein a sealing performance of the pass-through portion is ensured, one end portion of the earth member can be appropriately positioned into the fuel supply port device from an outside of the fuel supply port device.

Means for Solving the Problems

In order to obtain the aforementioned object, in the present invention, a fuel supply port device comprises a tubular main member portion where a fuel supply nozzle is inserted from a tube-upper-end side; a cover member combined with the tubular main member portion and covering a side portion on the tube-upper-end side of the tubular main member portion from an outside; an earth member electrically connecting a fuel-supply-nozzle side to be inserted and a body-panel side; and a seal member sandwiched between the cover member and the tubular main member portion by a combination of the cover member relative to the tubular main member portion, and sealing a pass-through portion of the earth member formed in the cover member, wherein the seal member forms an insert-through portion allowing a one-end-portion side of the earth member to be inserted to pass through from the outside of the tubular main member portion.

According to such a structure, the tubular main member portion and the cover member are combined in such a way so as to cover the side portion on the tube-upper-end side of the tubular main member portion forming the fuel supply port device by the cover member, so that the pass-through portion of the earth member formed in the cover member can be sealed in an airtight state by the seal member. Also, in the earth member, as mentioned above, the one-end-portion side thereof is inserted to pass through the insert-through portion of the seal member interposed between the tubular main member portion and the cover member from the outside of the tubular main member portion, so that the earth member can be set such that the fuel-supply-nozzle side and the body-panel side are electrically connected through the earth member. One end portion of the earth member and the insert-through portion can be sealed in the airtight state as well by the seal member.

One of the aspects of the present invention is that the tubular main member portion is formed by a main member and a guide member for the fuel supply nozzle to be incorporated inside the main member and made of an electrically conducting material, and that one end portion of the earth member contacts the guide member.

Also, one of the aspects of the present invention is that an attachment portion relative to the guide member is provided in the seal member.

Also, one of the aspects of the present invention is that the earth member is formed by a metal belt-like plate member.

Also, one of the aspects of the present invention is that the cover member is provided with a flap turned to an open position by an insertion of the fuel supply nozzle to allow the insertion of the fuel supply nozzle.

Effect of the Invention

According to the present invention, in this type of fuel supply port device, which comprises the tubular main member portion and the cover member attached to the tube-upper-end side thereof, wherein the cover member comprises the pass-through portion of the earth member, in a state wherein a sealing performance of the pass-through portion is ensured, one end portion of the earth member can be appropriately positioned into the fuel supply port device from the outside of the fuel supply port device. The fuel supply port device according to the present invention especially has a characteristic, wherein a particular attachment operation such as bonding, welding, or the like is not necessary for mounting the earth member.

BEST MODES OF CARRYING OUT THE INVENTION

Figure 10:
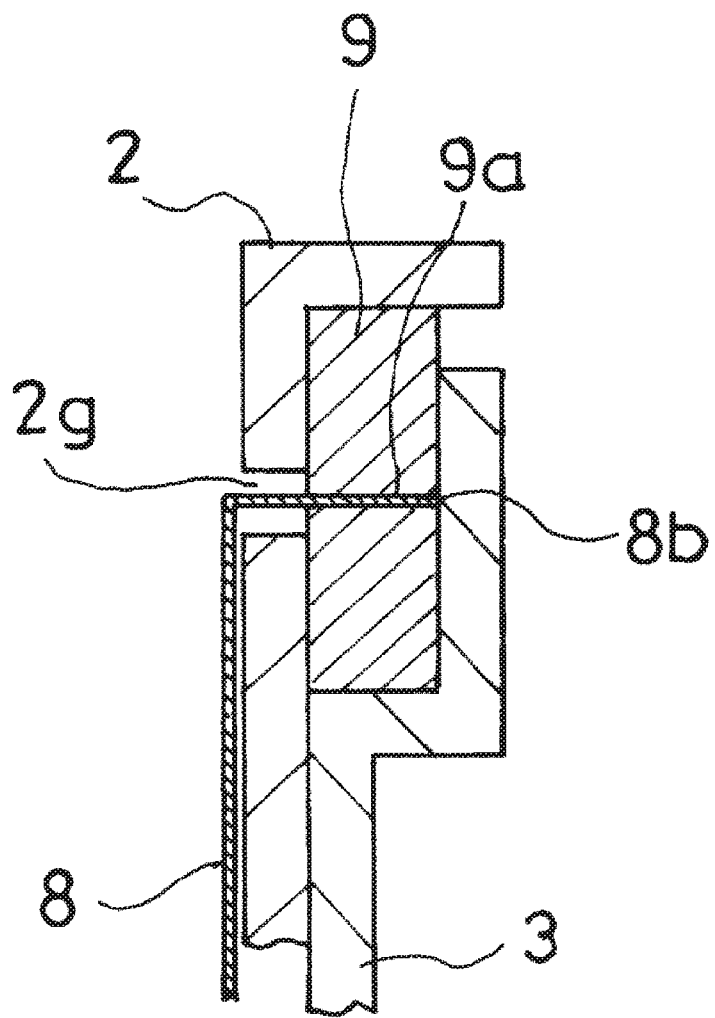
FIG. 10 is a cross-sectional structural view of essential parts of a schematic structural example of the fuel supply port device.
Figure 11:
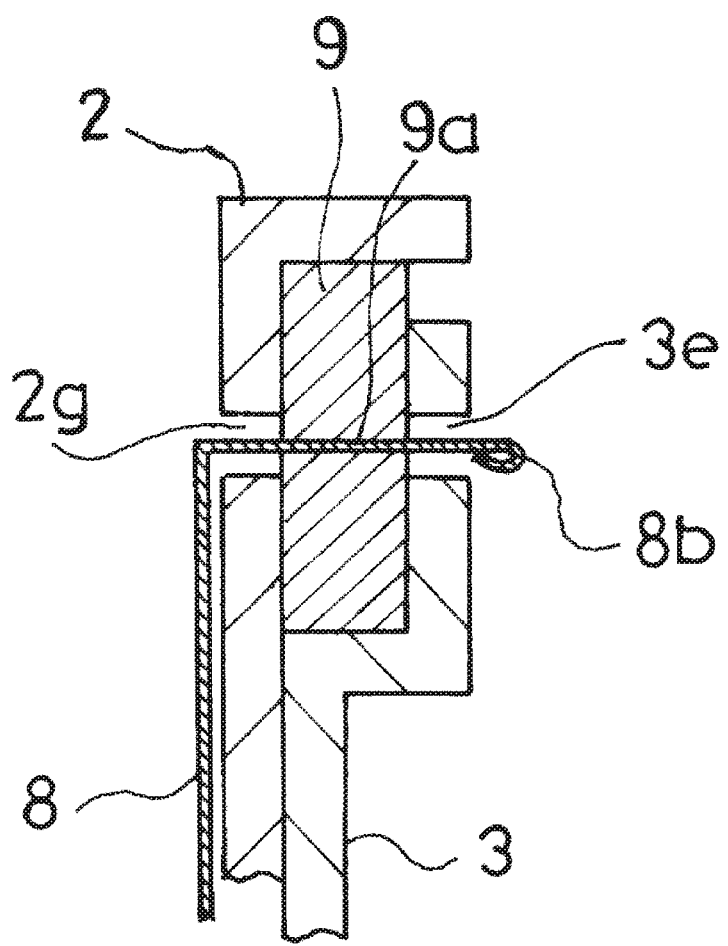
FIG. 11 is a cross-sectional structural view of essential parts of a schematic structural example of the fuel supply port device wherein one portion of a structure thereof is different from the structure of FIG. 10.

Hereinafter, based on FIG. 1 to FIG. 11, typical embodiments of the present invention will be explained. FIG. 1 to FIG. 9 show a specific structural example thereof; FIG. 10 shows a schematic structural example thereof; and FIG. 11 shows a schematic structural example wherein one portion of a structure thereof is different from the structure of FIG. 10.

A fuel supply port device according to the present embodiment is attached to a filler pipe (omitted in the drawings) to form a fuel supply port 1, and opens the fuel supply port 1 by an insertion of a fuel supply nozzle N to allow the insertion thereof, and automatically closes the fuel supply port 1 when the inserted fuel supply nozzle N is pulled out.

Namely, when the fuel supply nozzle N (see FIG. 3) of a fuel supply gun is inserted into the fuel supply port 1, such fuel supply port device turns the later-described sub-flap 2*b* and main flap 5*a* to an open position to allow the insertion of the fuel supply nozzle N so as to allow fueling, and when the inserted fuel supply nozzle N is pulled out, the fuel supply port device returns the later-described sub-flap 2*b* and main flap 5*a* to a closed position to automatically close the fuel supply port 1. Thereby, in such fuel supply port device, a cap of a screw-type fuel supply port 1 is unnecessary.

Such fuel supply port device is attached to an upper end portion of the filler pipe (a fuel injection pipe) (not shown in the drawings).

In an illustrated example, such fuel supply port device is formed by a cover member 2 and a tubular main member portion 3.

The tubular main member portion 3 is formed by a main member 4, a seal member 5, and a guide member 6. The seal member 5 is fitted into the main member 4, and the guide member is fitted into the seal member 5. The cover member 2 is attached to the tubular main member portion 3 such that a tube-upper-end 3*a* side of the tubular main member portion 3 is housed inside the cover member 2.

Figure 1:
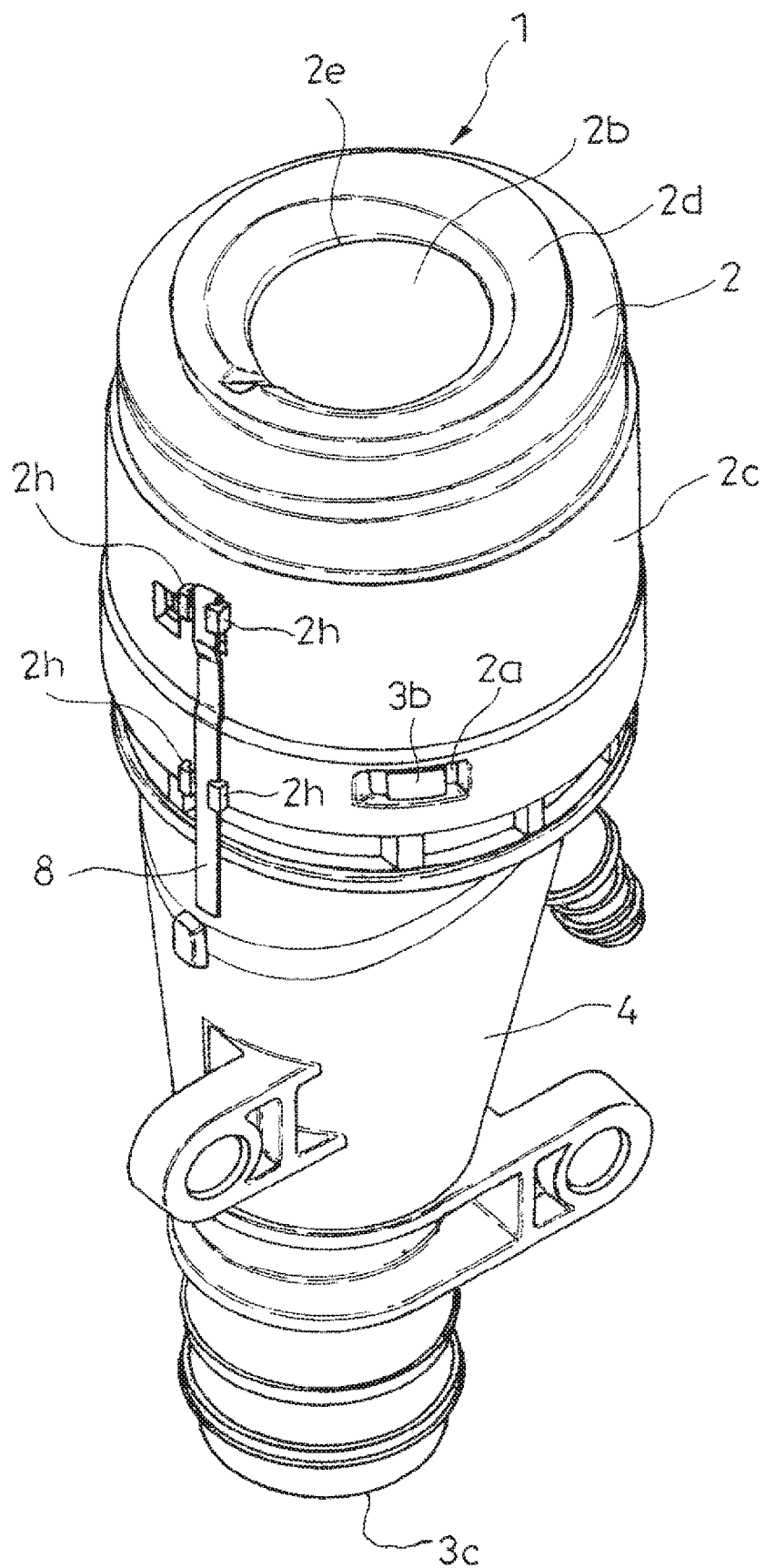
FIG. 1 is a perspective structural view of a fuel supply port device according to one embodiment of the present invention.
Figure 2:
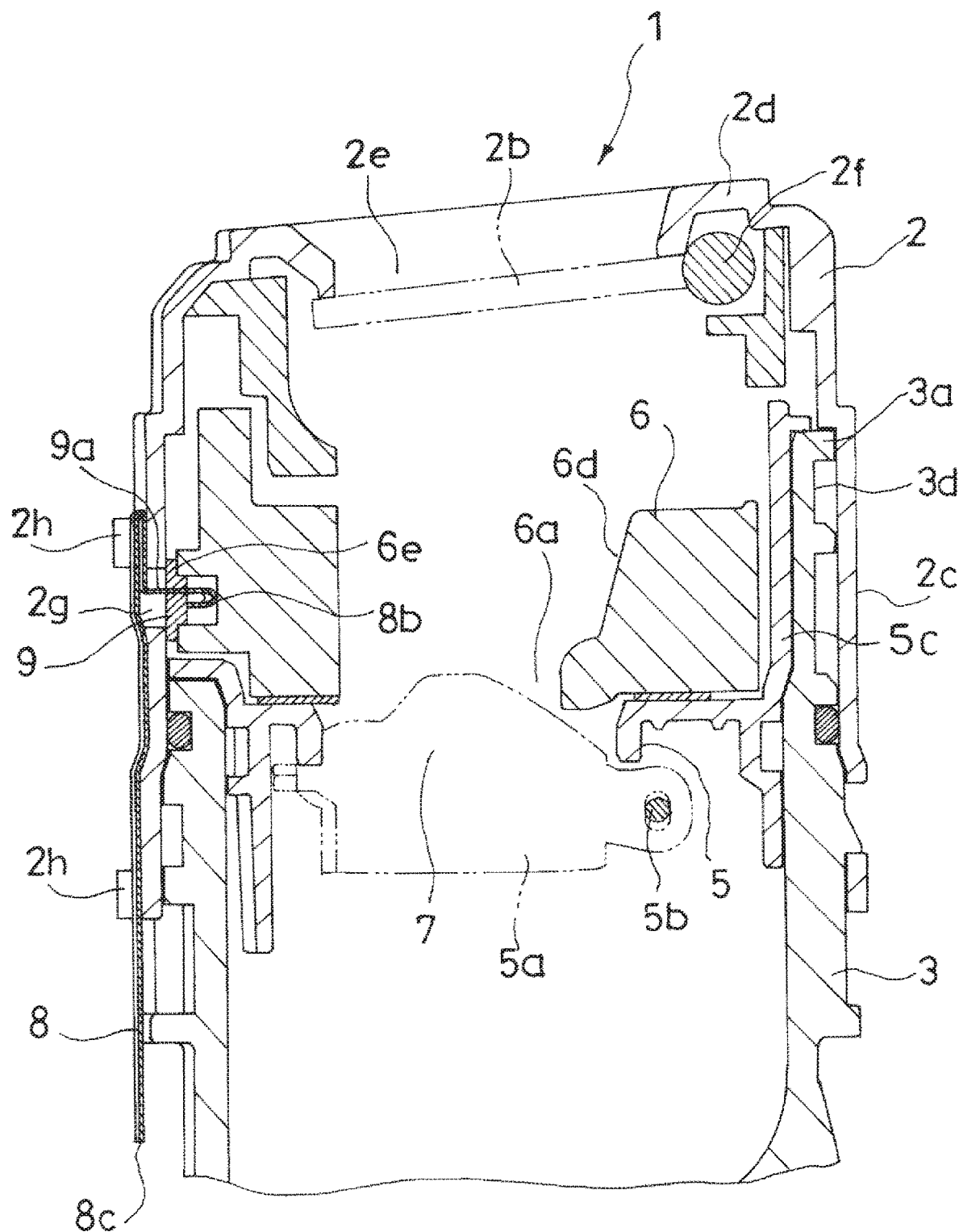
FIG. 2 is a cross-sectional structural view of the fuel supply port device.

In the illustrated example, the cover member 2 attached to the tubular main member portion 3 engages an engagement convex portion 3*b* formed outside the tubular main member portion 3 with a window hole shown by the reference 2*a* in FIG. 1.

Namely, in the embodiment, on a back side of the later-described sub-flap 2*b* provided in the cover member 2, there is provided the guide member 6 for the aforementioned fuel supply nozzle N, and on a back side of the guide member 6, there is provided the seal member 5 comprising the main flap 5*a* opened and closed by the fuel supply nozzle N.

(Tubular Main Member Portion 3)

The tubular main member portion 3 has a substantially tubular shape, and both the tube upper end 3*a* and a tube lower end 3*c* are open. In the illustrated example, the tubular main member portion 3 is attached to the filler pipe by fitting a tube-lower-end-3*c* side thereof in the filler pipe.

(Seal Member 5)

The seal member 5 comprises a cylindrical main member 5*c* and the main flap 5*a*. The cylindrical main member 5*c* opens both an upper end and a lower end, and has a substantially cylindrical shape. Between the upper end and the lower end, an internal space of the cylindrical main member 5*c* is divided into up and down by a partition wall 5*d*. An outer diameter of the cylindrical main member 5*c* is substantially equal to an inner diameter of the main member 4.

In the partition wall 5*d*, there is formed a circular pass-through opening 5*e* to allow the fuel supply nozzle N to pass. The main flap 5*a* is combined with the tubular main member to be turnable around a turning shaft shown by the reference 5*b* in FIG. 3. In the closed position, the main flap 5*a* presses the partition wall 5*d* from a lower side by urging of an urging device (omitted in the drawings, although, for example, a coil spring, a volute spring, a leaf spring, or the like can be listed) to close the pass-through opening 5*e*, thereby maintaining a closed state of the fuel supply port 1 unless the fuel supply nozzle N is inserted.

(Cover Member 2)

The cover member 2 comprises a cylindrical main member 2*c* and the sub-flap 2*b*. The cylindrical main member 2*c* opens a lower end, includes an inner flange 2*d* having a circumferential shape at an upper end, and forms a structure wherein a pass-through opening for the fuel supply nozzle N is formed by narrowing down an upper end opening by the inner flange 2*d*. Hereinafter, such pass-through opening of the cover member 2 is called a near-side pass-through opening 2*e*.

In the illustrated example, such cylindrical main member 2*c* has a substantially cylindrical shape. An inner diameter of the cylindrical main member 2*c* is substantially equal to an outer diameter on the tube-upper-end-3*a* side of the tubular main member portion 3. The tube upper end 3*a* of the tubular main member portion 3 fits into the cover member 2 from the lower end of the cylindrical main member 2*c* of the cover member 2, so that in a state wherein a side portion 3*d* on the tube-upper-end-3*a* side of the tubular main member portion 3 is covered from the outside by the cylindrical main member 2*c* of the cover member 2, the cover member 2 and the tubular main member portion 3 are combined.

Figure 3:
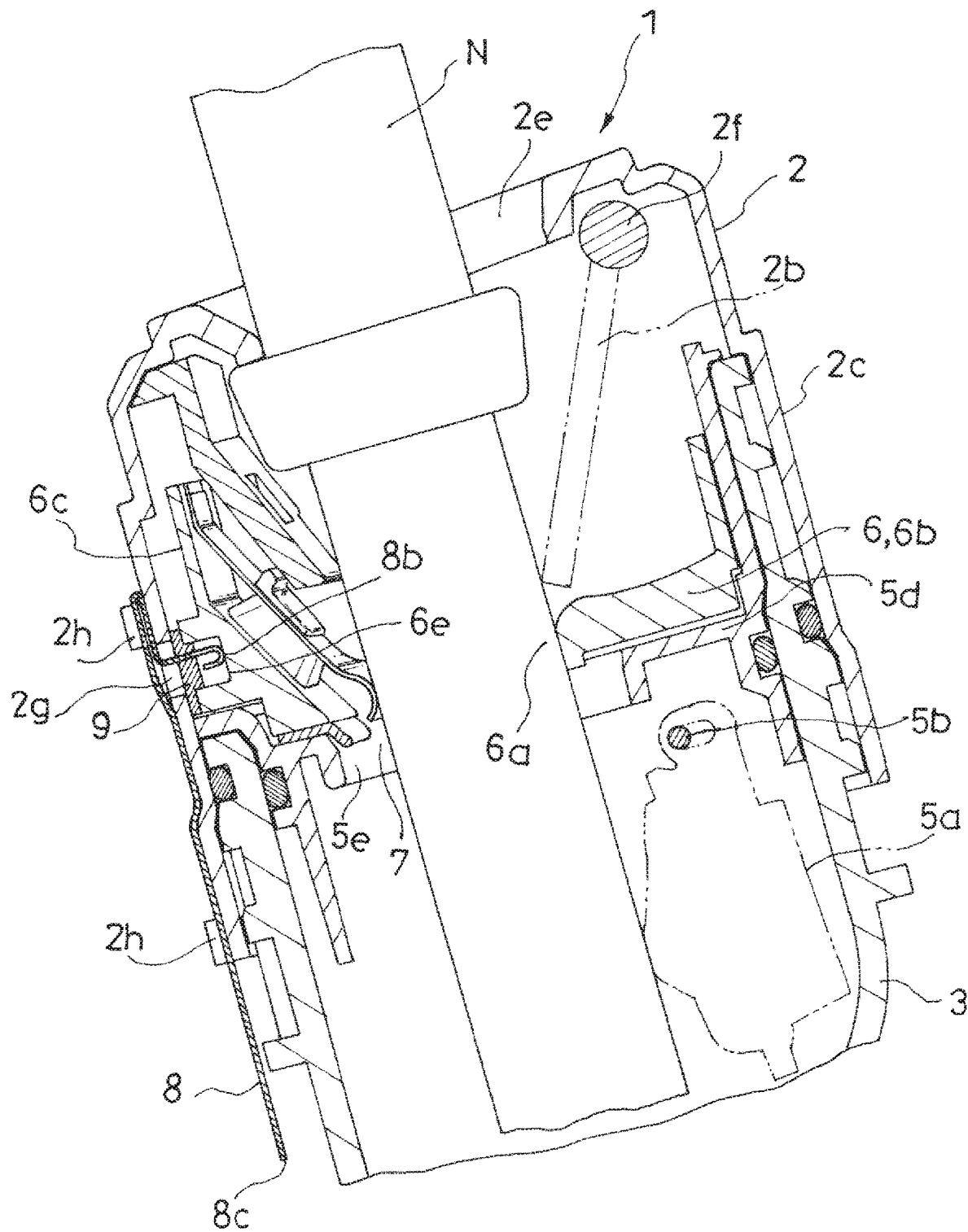
FIG. 3 is a cross-sectional structural view of the fuel supply port device, and shows a condition wherein a fuel supply nozzle is inserted.

The sub-flap 2*b* is combined with the cylindrical main member to be turnable around a turning shaft shown by the reference 2*f* in FIG. 3. In the closed position, the sub-flap 2*b* presses the inner flange 2*d* from a lower side by urging of an urging device (for example, the coil spring, the volute spring, the leaf spring, or the like can be listed, not shown in the drawings) to close the near-side pass-through opening 2*e*, thereby maintaining the closed state of the fuel supply port 1 unless the fuel supply nozzle N is inserted.

(Guide Member 6)

The guide member 6 is fitted between the upper end of the seal member 5 and the partition wall 5*d* from an upper end side of the seal member 5. In the guide member 6, in the aforementioned fitted state, there is formed a pass-through opening 6*a* positioned above the pass-through opening 5*e* of the seal member 5.

In the illustrated example, on the back side of the sub-flap 2*b*, there is formed a back-side pass-through opening 7 for the fuel filling nozzle N by the pass-through opening 5e of the seal member 5 and the pass-through opening 6a of the guide member 6.

The guide member 6 includes a side portion 6c surrounding a lower portion 6b which makes a contact with the seal member 5, comprises the pass-through opening 6a in the lower portion 6b, and has a guide slope face 6d for the fuel supply nozzle N on an upper face of the lower portion 6b.

When an insertion operation into the fuel supply port 1 of the fuel supply nozzle N of the fuel supply gun is carried out, first, the sub-flap 2b turns to the open position so as to allow the fuel supply nozzle N to enter a back from the near-side pass-through opening 2e. When the fuel supply nozzle N enters the back from the near-side pass-through opening 2e, a tip of the fuel supply nozzle N can be guided to the back-side pass-through opening 7 by the guide slope face 6d of the guide member 6. When the fuel supply nozzle N of the fuel supply gun is guided to the back-side pass-through opening 7, the main flap 5a turns to the open position so as to allow the fuel supply nozzle N to enter the back from the back-side pass-through opening 7.

(Earth Member 8)

The fuel supply port device according to the embodiment includes an earth member 8 electrically connecting between a fuel-supply-nozzle-N side to be inserted and a body-panel (omitted in the drawings) side.

In the embodiment, the earth member 8 is formed by a metal belt-like plate member. In the embodiment, the earth member 8 is formed by applying a bend to one narrow belt-like plate member 8a.

The earth member 8 includes one end portion 8b positioned inside the fuel supply port device, and the other end portion 8c positioned outside the fuel supply port device.

In a case wherein a portion in the tubular main member portion 3 with which the one end portion 8b of the earth member 8 contacts is made of an electrically conducting material such as a conductive plastic and the like, and wherein the cover member 2 is made of a nonconductive material, as shown in FIG. 10, the earth member 8 is set such that the one end portion 8b contacts an outer face of the tubular main member portion 3 through an insert-through portion 9a of the later-described seal member 9, and the other end portion 8c contacts the body-panel side so as to electrically connect between the fuel-supply-nozzle-N side and the body-panel side through the earth member 8.

Also, as shown in FIG. 11, in a case wherein the one end portion 8b of the earth member 8 directly contacts the fuel supply nozzle N to be inserted inside the tubular main member portion 3 through a pass-through portion 3e formed in the tubular main member portion 3 as well, the fuel-supply-nozzle-N side and the body-panel side can be electrically connected through the earth member 8.

(Seal Member 9)

Also, the fuel supply port device according to the embodiment comprises the seal member 9 sandwiched between the cover member 2 and the tubular main member portion 3 by a combination of the cover member 2 relative to the tubular main member portion 3, and sealing a pass-through portion of the earth member 8 formed in the cover member 2.

Therewith, in the seal member 9, there is formed the insert-through portion 9a so as to insert and pass a one-end-portion 8b side of the earth member 8 from the outside of the tubular main member portion 3.

Thereby, in the embodiment, the tubular main member portion 3 and the cover member 2 are combined in such a way so as to cover the side portion on the tube-upper-end side of the tubular main member portion 3 forming the fuel supply port device by the cover member 2, so that a pass-through portion 2g of the earth member 8 formed in the cover member 2 can be sealed in an airtight state by the seal member 9. Also, in the earth member 8, as mentioned above, the one-end-portion 8b side thereof is inserted to pass through the insert-through portion 9a of the seal member 9 interposed between the tubular main member portion 3 and the cover member 2 from the outside of the tubular main member portion 3, so that the earth member 8 can be set such that the fuel-supply-nozzle N side and the body-panel side are electrically connected through the earth member 8.

The seal member 9 is made of rubber or plastic having rubber-like elasticity, and the insert-through portion 9a receives the one end portion 8b of the earth member 8 by an elastic deformation on a seal-member-9 side. Thereby, the one end portion 8b of the earth member 8 and the insert-through portion 9a are sealed in the airtight state as well.

Figure 4:
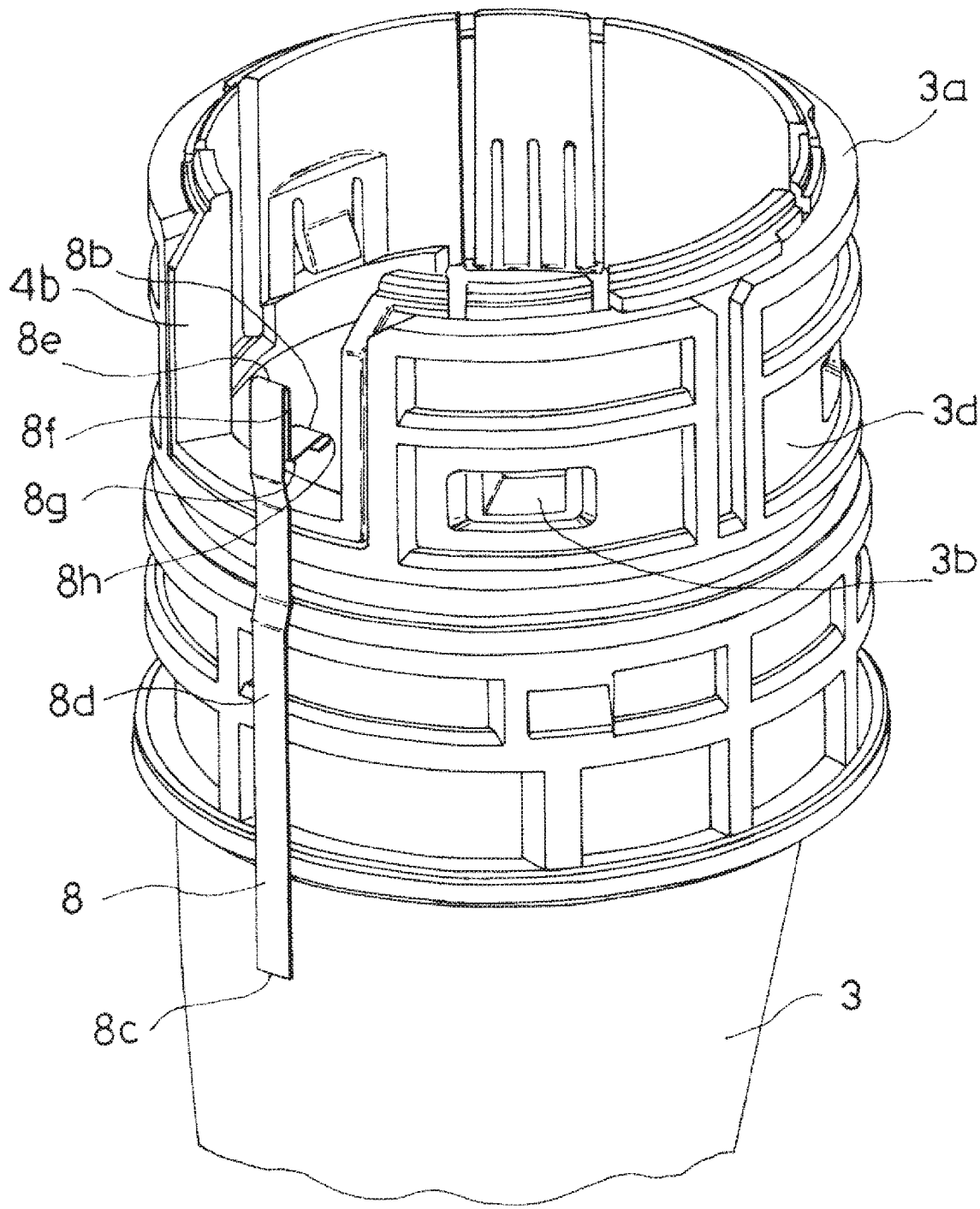
FIG. 4 is a perspective structural view of a main member of a tubular main member portion showing a state wherein a cover member and a guide member forming the fuel supply port device are removed, and shows an earth member together.
Figure 5:
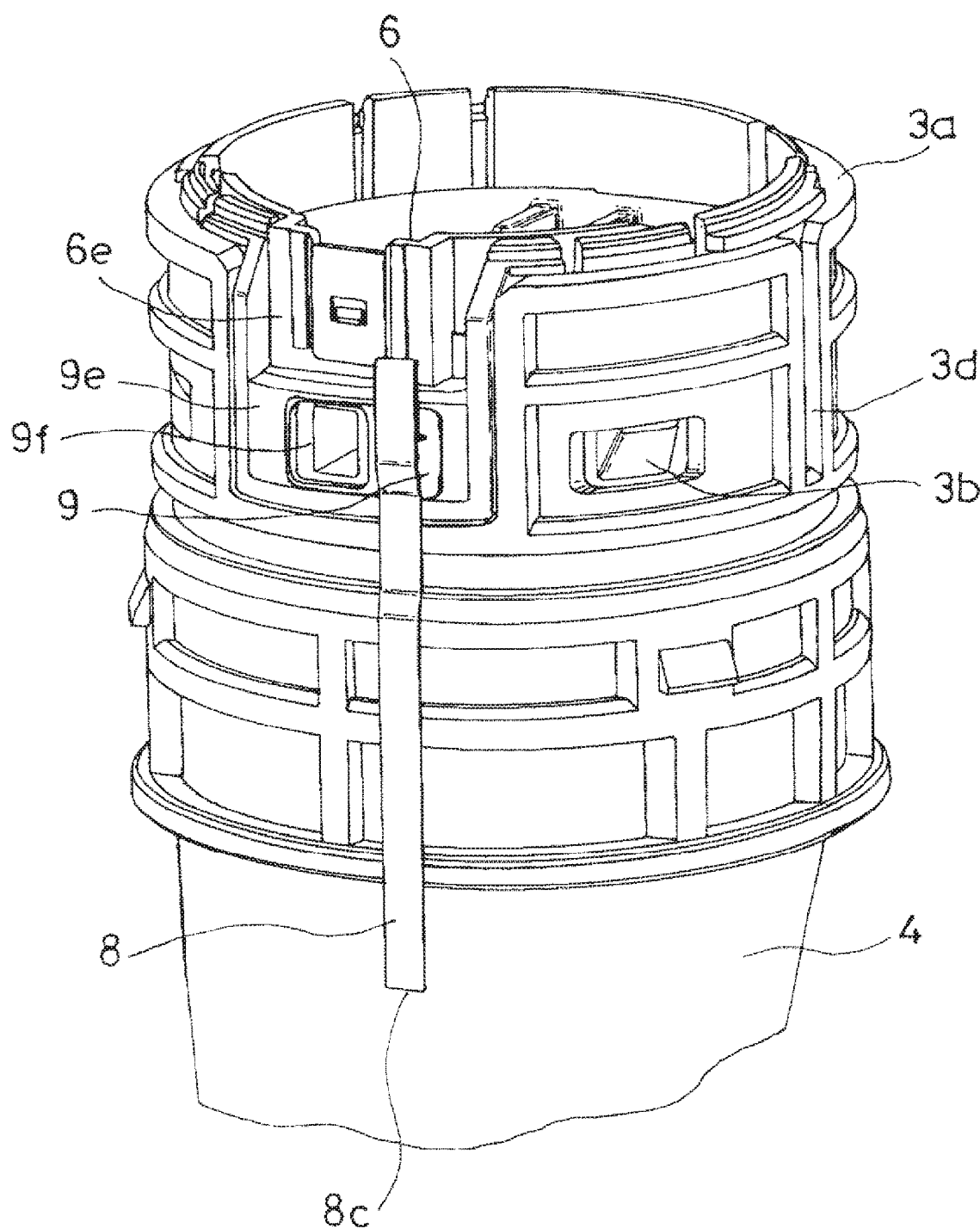
FIG. 5 is a perspective structural view of the tubular main member portion showing a state wherein the cover member forming the fuel supply port device is removed.
Figure 6:
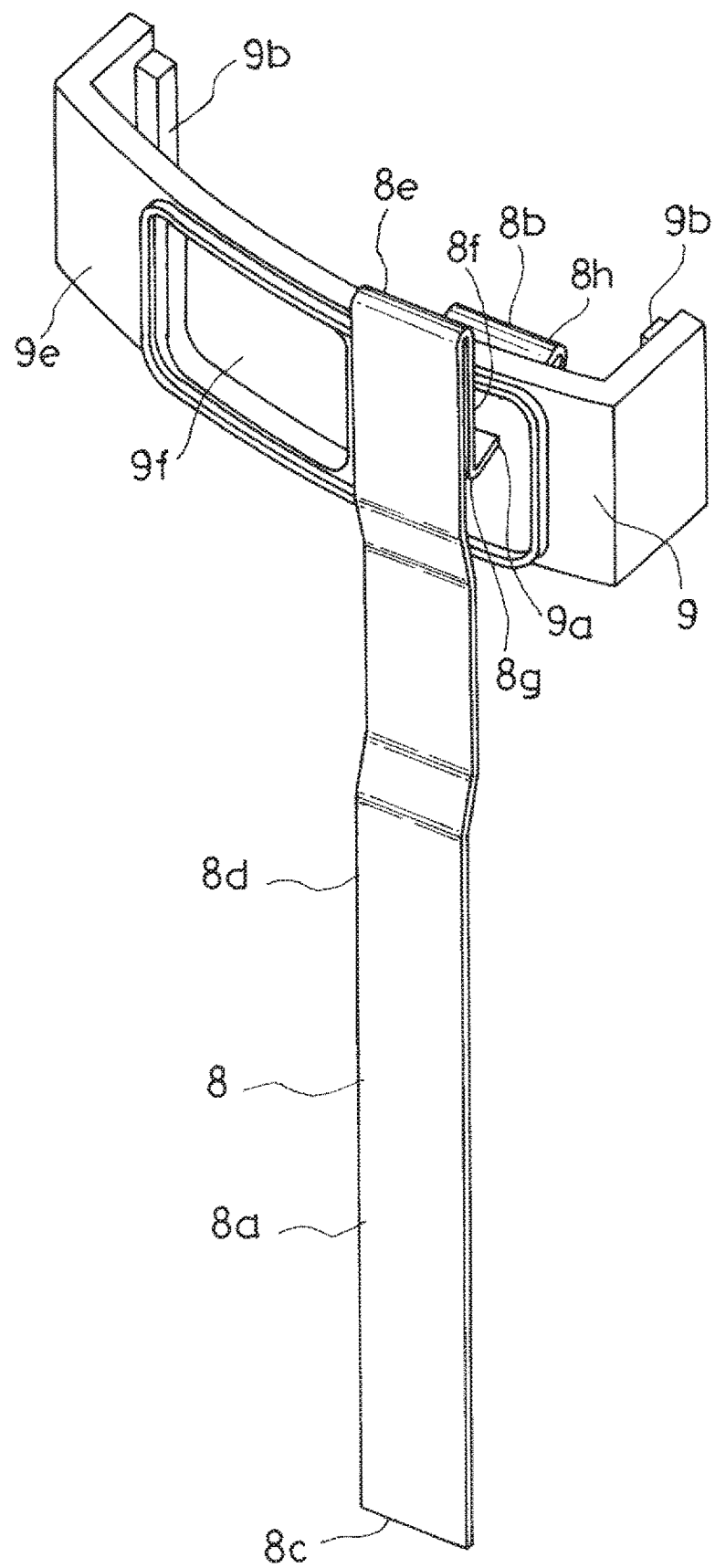
FIG. 6 is a perspective view of the earth member and a seal member forming the fuel supply port device.
Figure 7:
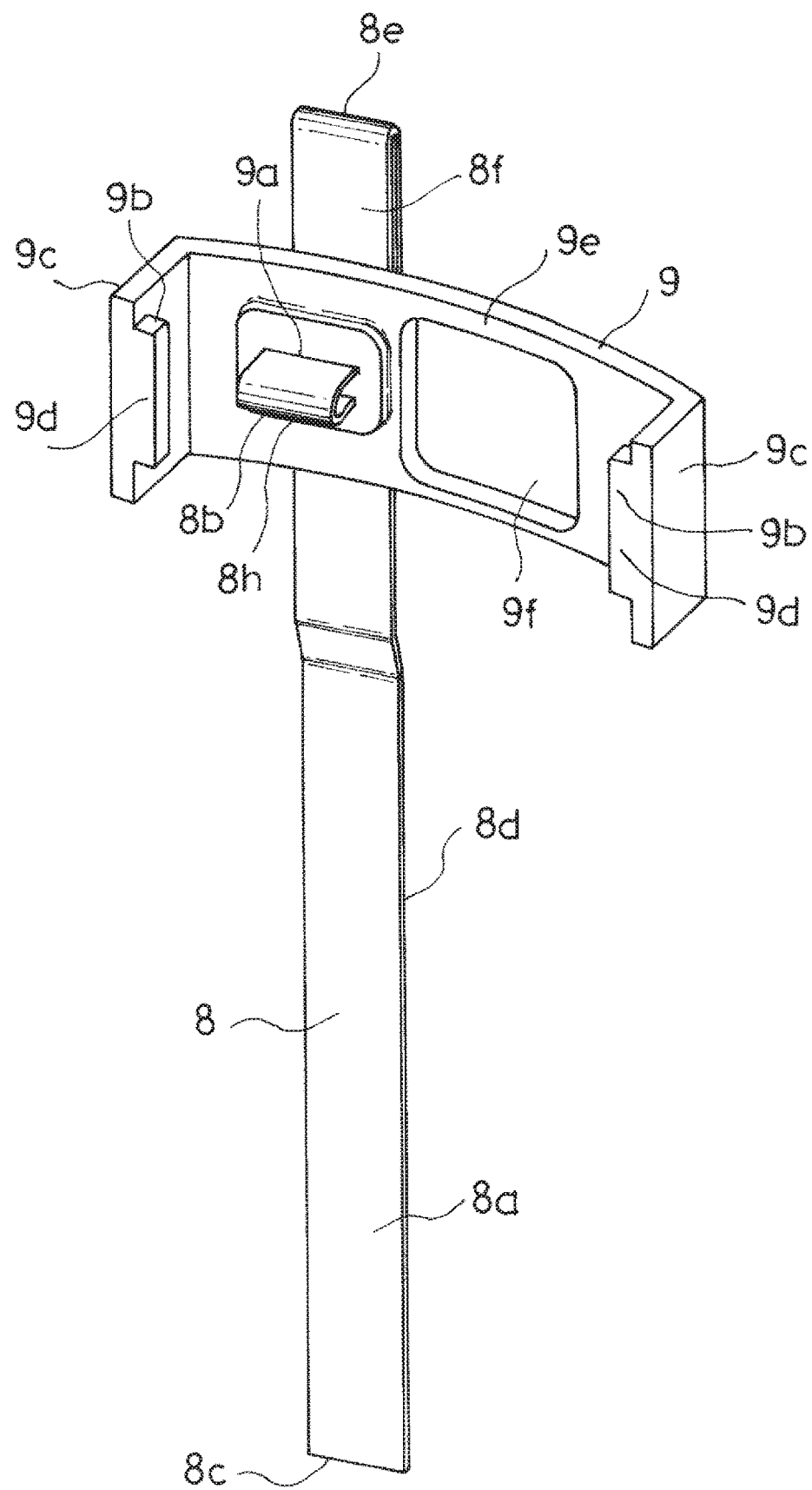
FIG. 7 is a perspective view of the earth member and the seal member forming the fuel supply port device viewed from a side opposite to FIG. 6.

In the illustrated example, at a position between an upper end in the main member 4 of the tubular main member portion 3 and the partition wall 5d of the seal member 5, there is formed a notch portion 4b (FIG. 4). Then, when the guide member 6 is combined with the main member 4, one portion 6e on an outer face of the side portion 6c of the guide member 6 can be housed in the notch portion 4b (FIG. 5).

Then, attachment portions 9b relative to the one portion 6e of the guide member 6 are formed in the seal member 9. In the illustrated example, the seal member 9 is combined relative to the guide member 6 with the attachment portions 9b in such a way so as to cover a lower side from a position approximately in a middle in an up-and-down direction of the one portion 6e of the guide member 6 by the seal member 9.

Thereby, in the embodiment, the guide member 6 to which the seal member 9 is attached is combined with the main member 4 so as to form the tubular main member portion 3 with the seal member 9.

In the illustrated example, the seal member 9 comprises a base plate portion 9e having a long rectangular outline in a horizontal direction; and the attachment portions 9b respectively formed at right-and-left end portions of the base plate portion 9e. Each attachment portion 9b includes a rising portion 9c rising substantially at a right angle relative to an inner face of the base plate portion 9e; and a claw portion 9d projecting toward a center side of the base plate portion 9e from a tip of the rising portion 9c. The seal member 9 is integrated with the guide member 6 by hooking the respective claw portions 9d forming the right-and-left attachment portions 9b on an attached portion (not shown in the drawings) formed in the one portion 6e of the guide member 6.

Figure 8:
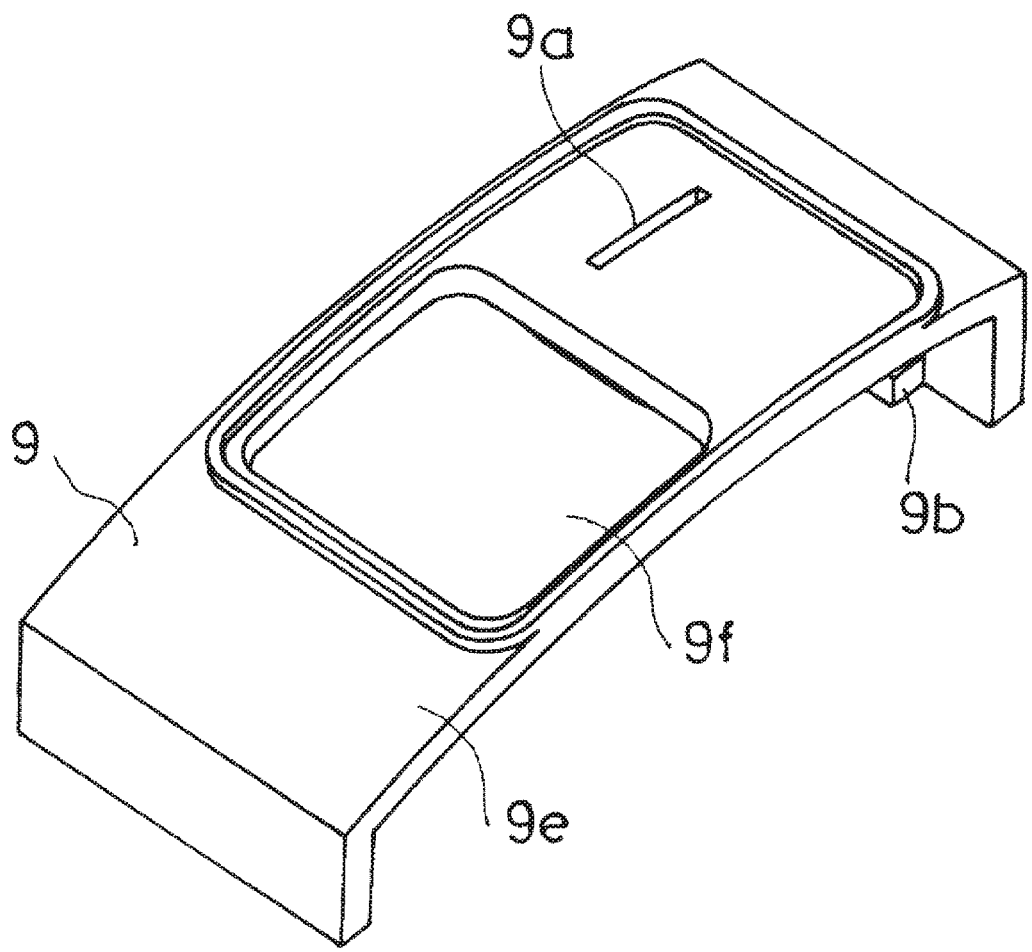
FIG. 8 is a perspective view of the seal member forming the fuel supply port device.
Figure 9:
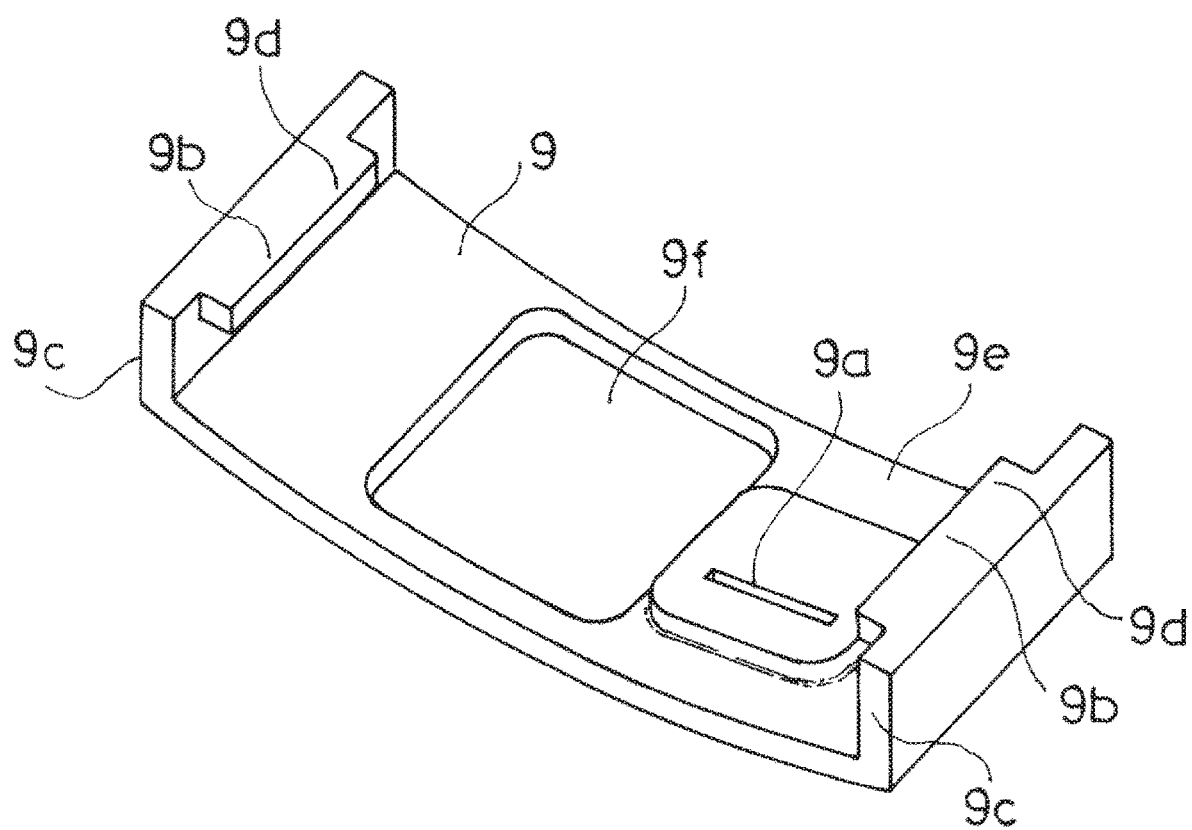
FIG. 9 is a perspective view of the seal member forming the fuel supply port device viewed from a side opposite to FIG. 8.

In the illustrated example, in the seal member 9, there is formed a square through hole 9f between both right-and-left ends, and the insert-through portion 9a is formed by a long slit in a lengthwise direction of the seal member 9 formed between the through hole 9f and the end portion on the right side in FIG. 8 of the seal member 9.

Incidentally, the through hole 9f forms a part of a drain opening formed in such a way so as to communicate inside and outside of the fuel supply port device for discharging a subject to be drained such as water, fuel, dust, or the like accumulated inside the fuel supply port device on a near side of the seal member 5 to an outside of the fuel supply port device. Also, the drain opening is closed when the fuel supply nozzle N is inserted by a closing mechanism (not shown in the drawings).

In a specific structural example shown in FIG. 1 to FIG. 9, the earth member 8 includes a first portion 8d wherein a lower end is the other end portion 8c; a second portion 8f continuing to an upper end of the first portion 8d through a folded portion 8e, and extending downward; and a third portion 8h continuing to a lower end of the second portion 8f through a folded portion 8g, and extending in a direction substantially orthogonal to the first portion 8d. A terminal of the third portion 8h functions as the one end portion 8b. The terminal of the third portion 8h is formed by a portion folded back in a curved shape on a second-portion-8f side. The third portion 8h is inserted to pass through the insert-through portion 9a of the seal member from the outside.

The first portion 8d is positioned in such a way so as to become parallel to a center shaft of the fuel supply port device outside a side portion of the cover member 2. In the illustrated example, in the side portion of the cover member 2, there are formed holding claws 2h for holding the first portion 8d positioned in the aforementioned manner.

Incidentally, obviously, the present invention is not limited to the embodiment explained hereinabove, and includes all embodiments which can attain the object of the present invention.

EXPLANATION OF SYMBOLS

N a fuel supply nozzle
2 a cover member
2g a pass-through portion
3 a tubular main member portion
3a a tube upper end
8 an earth member
8b one end portion
9 a seal member
9a an insert-through portion Incidentally, all contents of the specification, claims, drawings, and abstract of Japanese Patent Application No. 2017-125227 filed on Jun. 27, 2017 are cited in their entireties herein and are incorporated as a disclosure of the specification of the present invention.

What is claimed is:

1. A fuel supply port device, comprising:
a tubular main member portion where a fuel supply nozzle is inserted from a tube-upper-end side;
a cover member combined with the tubular main member portion and covering a side portion on the tube-upper-end side of the tubular main member portion from an outside;
an earth member electrically connecting a fuel-supply-nozzle side to be inserted and a body-panel side; and
a seal member sandwiched between the cover member and the tubular main member portion by a combination of the cover member relative to the tubular main member portion, and sealing a pass-through portion of the earth member formed in the cover member,
wherein the seal member includes an insert-through portion allowing a one-end-portion side of the earth member to be inserted to pass through from the outside of the tubular main member portion.

2. A fuel supply port device according to claim 1, wherein the tubular main member portion includes a main member and a guide member for the fuel supply nozzle incorporated inside the main member and made of an electrically conducting material, and one end portion of the earth member contacts the guide member.

3. A fuel supply port device according to claim 2, wherein the seal member includes an attachment portion relative to the guide member.

4. A fuel supply port device according to claim 1, wherein the earth member is formed by a metal belt-like plate member.

5. A fuel supply port device according to claim 1, wherein the cover member includes a flap turned to an open position by an insertion of the fuel supply nozzle to allow the insertion of the fuel supply nozzle.

* * * * *